March 5, 1957

C. A. MILLS 2,783,618

RADIANT COOLING TUNNELS

Filed March 1, 1955

INVENTOR.
CLARENCE A. MILLS.
BY

ATTORNEYS.

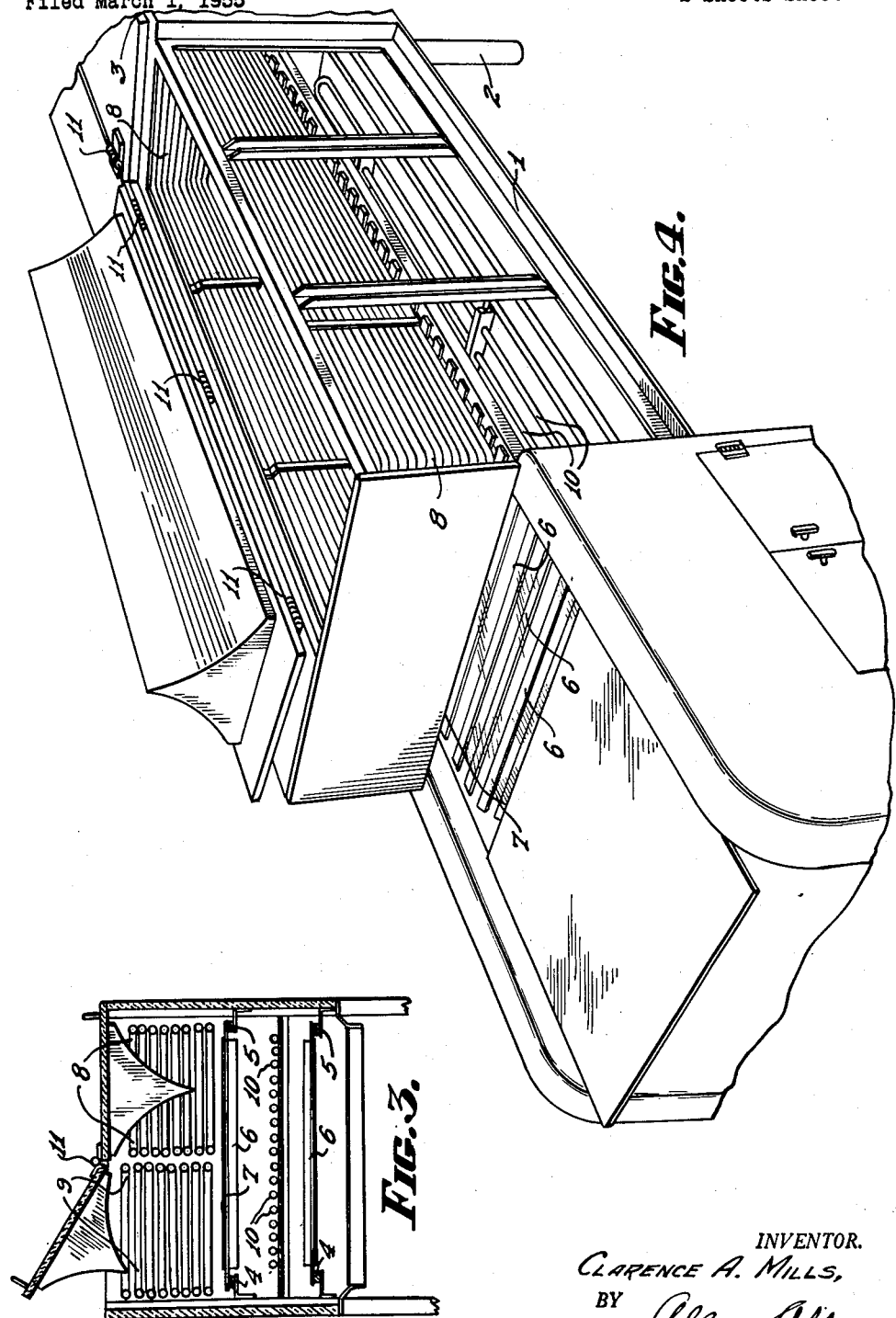

United States Patent Office 2,783,618
Patented Mar. 5, 1957

2,783,618
RADIANT COOLING TUNNELS

Clarence A. Mills, Cincinnati, Ohio, assignor to Reflectotherm, Inc., Cincinnati, Ohio, a corporation of Ohio Application March 1, 1955, Serial No. 491,401

9 Claims. (Cl. 62—99)

My invention relates to cooling tunnels ordinarily referred to in confection, cookie and baking plants as enrober or product cooling tunnels.

Such cooling tunnels prior to my invention consisted of belt conveyors moving through enclosed casings or tunnels provided with fans to direct cooling air currents against the confections or enrobed cookies or cakes as they moved along on the conveyor.

The cooling was entirely accomplished by ordinary convection cooling in which the air particles moving into contact with the confections picked up heat and thus gradually removed heat from the heat treated products. The cooling or crystallization of the heat treated product or coating was always from the outside in so that frequently a crust of crystallized or hardened product layer sugar formed on the outside which greatly delayed the cooling or crystallization on the inside. Time was the only element which would accomplish the solidification of the coating so that the length of time required for proper cooling so that the cookies or other heat treated products could be packed was unduly delayed. This required long conveyors, great waste of cooling air and a large accumulation of capital invested in baked goods which had to be held merely in the cooling tunnels.

It is my object to approach the problem of cooling by utilizing the principle of radiant heat dissipation and absorption. Thus I position reflective surfaces with such relation to the confections or other heat treated products as they move along on the conveyor that the radiant heat rays from the confections are reflected by reflective surfaces so as to be absorbed by cooling coils.

Since the coating for confections is normally transparent in varying degrees to the longer infra-red rays, I find that the crystallization or caramelizing of the coating or cooling and hardening of the coating or at times the whole body of the heat-treated product takes place throughout the interior as well as on the surface by radiant heat emission from all layers of the product outward through the infra-red transparent material, so long as such heat-treated product be surrounded by infra-redray absorbing surfaces and proper provision for removal from the scene of such absorbed radiant heat. Thus I avoid production of a cooled outer crust or layer with the deeper layers still retaining their heat or remaining undesirably soft.

A cooling period of undue or undesirable length is no longer necessary and the speed of the conveyors can be increased so that the total cooling time can be reduced sharply as compared to former practices.

As desirable apparatus for carrying out my new cooling method, I have illustrated in the drawings an enrober cooling tunnel in which radiant reflective cooling may be carried out on a practical factory scale.

In the drawings:

Figure 3 is a section along the line 3—3 of Figure 2.

Figure 4 is a perspective view of the tunnel with one sidewall removed.

Figure 1:
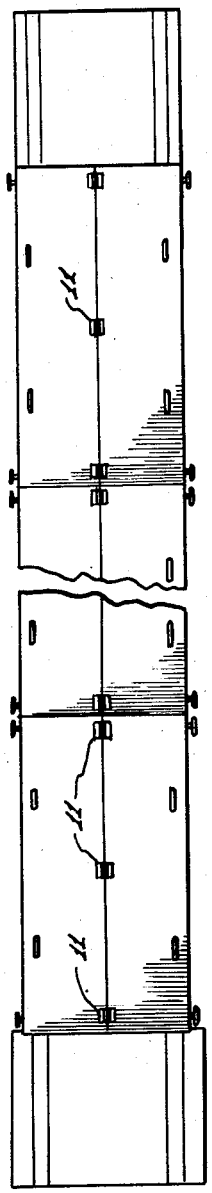
Figure 1 is a plan view of a cooling tunnel.
Figure 2:
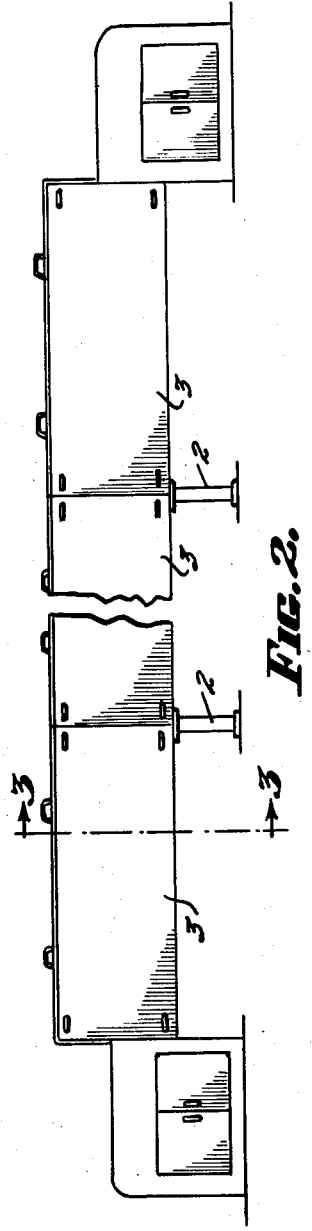
Figure 2 is a side elevation of the tunnel.

Referring to Figure 4 of drawings the tunnel is built up from angle iron frame members 1, having supporting legs 2 and with removable wall panels 3 which form, when assembled together, an enclosure open only at the front or receiving end and at the delivery end.

Within the casing are two link belt chains 4 and 5 at opposite sides running over sprockets and with cross flights 6. Laid on over the cross flights there is an endless belt 7 (Figure 3) composed of some transparent plastic material such as polyethylene which permits the heat rays to pass through.

Within the casing there are two sets of coils 8 and 9, arranged in vertical position. The coils are preferably formed of flat blackened metal such as aluminum or magnesium coated with a flat black coating. This facilitates radiant heat reception or absorption.

Below the conveyor and plastic belt there is another coil 10 with its pipes extending horizontally so that radiant rays passing down through the belt will be absorbed by the cooling water within the coils.

The covers for the tunnel are formed from flat panels hinged as indicated at 11, so as to make it possible to clean the reflector panels carried on the doors.

The reflective panels extend in a V formation with the point of the V fairly close to the conveyor belt. The reflective surfaces one on each side, are curved in parabolic curves so as to reflect the radiant rays from the coated cakes or cookies either to the right to be absorbed by the side coils, or to the left to be absorbed by the middle coils.

The space above the belt is divided medially lengthwise by the two sets of side coils and the two sets of right and left reflector panels.

There is no mechanical reason for the two sets of coils and reflector panels except convenience. If the belt is only half the width of the belt indicated only one set of coils and one set of reflector panels will be required.

It should further be understood that though the polyethylene belt provides the last step in effective cooling by making the horizontally arranged coil available as a radiant heat wave receiver, in some modification the intermediate coils may be dispensed with and the cooling effected only by the side and intermediate coils. The curved reflector panels are, however, an essential element of my invention because without these reflectors, while some radiant rays would be picked up by the coils, the majority of the rays would merely reflect up and back without accomplishing any effective cooling.

Where a change from a fluid or semi-fluid to a solid state is desired—radiant cooling gives surprisingly rapid results, results explainable only on the assumption that much of the heat of fusion liberated through the material as it solidified is emitted directly as radiant energy at wave-lengths to which the product mass is to a considerable degree transparent. A radiant cooling and setting-up or hardening time of 5 minutes results instead of 18 minutes required for convective surface cooling. I have determined that organic materials have varying transparency to many types of ultra-long radiations.

The molecules and atoms of all materials are in constant activity and are emitting radiant energy even when in a "stationary" state of constant temperature, the amount of such radiant energy emitted being proportional to the fourth power of thet material's absolute temperature. In "stationary" states, this emitted radiant energy has three sources:

(a) Electron vibrations in the outer shell of the atom.
(b) Vibrations of atomic nuclei.
(c) Rotations of the molecule as a whole.

Radiant energy emitted from (a) and (b) lie in the shorter infra-red wave-lengths (1 to 10 microns) while that from (c) lies far out in the longest infra-red ranges (100 microns). In amounts of energy radiated (a) is greatest, (b) next and (c) least.

When a change is made from one "stationary" state to another, definite additional quantums of energy are involved either in the direction of absorption or emission. Changes from solid to liquid to gaseous state involve energy absorption by the molecules or atoms, while in the reverse direction of change similar quantums of energy are emitted. Molecular re-arrangements or change in "stationary" state are associated with absorption or emission of radiant energy in the far infra-red range of wavelengths (100 to 400 microns), intra-molecular re-arrangements of ions or radicals are associated with absorption or omission in the shorter infra-red wave-lengths (1 to 10 microns), while changes within the atom are associated with absorption or emission in the visible and ultra-violet ranges of wave-lengths (0.8 to 0.2 micron).

Likewise, energy liberated by a "change of state" of molecules, as from liquid to solid state (latent heat of fusion), is emitted in these same far infra-red wavelengths to which the organic mass is transparent; hence this energy is removable also directly in radiant form from point of internal molecular emission to point of external absorption. Proper external facilities for radiant energy absorption at all wave lengths can thus greatly facilitate the cooling of organic materials and their conversion to a solidified state.

My system may make use of interior surfacing materials (such as rolled aluminum or other similarly reflective metallic sheet) for conditioned spaces which are either radiant-heat reflective for all wave-lengths above the visible range or fully absorptive and/or emissive for all such wave-lengths. To obtain the needed highly absorptive and/or emissive radiant heat transfer surface for radiant heat input or removal, the metallic surface is thoroughly coated with lampblack or similarly infra-red-absorptive material.

It will be obvious that mechanical arrangements other than that illustrated an described will occur to those skilled in this art without departing from the principle of cooling from the inside out which as far as I am advised, is new and leads to surprising cooling effectiveness.

Having thus described my invention, what I claim as new and desire to secure by Letters Patent is:

1. And endless conveyor and cooling tunnel having enclosing side walls, said conveyor being of the type having link chains which pass over sprockets and which have cross flights extending across between the links, a conveyor belt carried by the cross flights, spaced cooling coils extending vertically at right angles up from the conveyor belt and a two-faced curved reflector member having arcs of curvature which reflect heat waves from the conveyer partly against the cooling coil on one side and partly against the cooling coil which is spaced from the first noted cooling coil on the other side.

2. As a cooling conveyor an endless belt passing horizontally through a tunnel, cooling coils arranged in vertically spaced position with reference to the belt and curved reflector plates in a V-shaped arrangement having the tip of the V adjacent the conveyor intermediate the coils and curved reflector plates flaring outwardly from the tip of the V, having such reflective contours as to reflect heat rays from the belt against the cooling coils, substantially one half of the conveyor between the coils reflecting against one coil and substantially the other half reflecting against the other coil.

3. As a cooling conveyor an endless belt passing horizontally through a tunnel, cooling coils arranged in vertically spaced position with reference to the belt and curved reflector plates in a V-shaped arrangement having the tip of the V adjacent the conveyor intermediate the coils and curved reflector plates flaring outwardly from the tip of the V, having such reflective contours as to reflect heat rays from the belt against the cooling coils, substantially one half of the conveyor between the coils reflecting against one coil and substantially the other half reflecting against the other coil, said curved reflector plates in the V-shaped arrangement being mounted on a pivoted cover which may be swung up to permit cleaning of the reflectors.

4. As a cooling conveyor an endless belt passing horizontally through a tunnel, cooling coils arranged in vertically spaced position with reference to the belt and curved reflector plates in a V-shaped arrangement having the tip of the V adjacent the conveyor intermediate the coils and curved reflector plates flaring outwardly from the tip of the V, having such reflective contours as to reflect heat rays from the belt against the cooling coils, substantially one half of the conveyor between the coils reflecting against one coil and substantially the other half reflecting against the other coil, said endless belt being composed of heat ray penetrative material and a cooling coil arranged horizontally below said belt intermediate of the endless loop of the belt.

5. An enclosed cooling conveyor comprising an endless belt provided with supports and a drive to cause said belt to move, enclosing walls for said conveyor, cooling coils arranged vertically of the belt at the edges thereof and a pair of cooling coils arranged vertically adjacent the middle of the belt, radiant reflectors having curved surfaces extending lengthwise of said conveyor, one pair of reflectors arranged with one surface to reflect heat waves from one half of the belt against an edge positioned coil and the other surface to reflect heat waves against a middle arranged coil and the other pair of reflectors arranged with one surface to reflect heat waves from the other half of the belt against the opposite edge positioned coil and the other surface to reflect heat waves against the other middle arranged coil.

6. An enclosed cooling conveyor comprising an endless belt provided with supports and a drive to cause said belt to move, enclosing walls for said conveyor, cooling coils arranged vertically of the belt at the edges thereof and a pair of cooling coils arranged vertically adjacent the middle of the belt, radiant reflectors having curved surfaces extending lengthwise of said conveyor, one pair of reflectors arranged with one surface to reflect heat waves from one half of the belt against an edge positioned coil and the other surface to reflect heat waves against a middle arranged coil and the other pair of reflectors arranged with one surface to reflect heat waves from the other half of the belt against the opposite edge positioned coil and the other surface to reflect heat waves against the other middle arranged coil, said belt being composed of heat ray penetrative material and a horizontally arranged coil intermediate the endless loop of the belt.

7. In combination with an endless horizontally moving conveyor belt housed in a casing, a series of cooling coils arranged vertically of the conveyor belt and curved reflectors extending in the casing to reflect heat waves from the conveyor against the cooling coils, said reflectors mounted on a pivoted cover member adapted to swing up to expose the reflectors for cleaning.

8. In combination with an endless horizontally moving conveyor belt housed in a casing, a series of cooling coils arranged vertically of the conveyor belt and curved reflectors extending in the casing to reflect heat waves from the conveyor against the cooling coils, said belt being composed of polyethylene to permit passage of heat rays therethrough and a cooling coil arranged horizontally under the top loop of said conveyor.

9. In combination with an endless horizontally moving conveyor belt housed in a casing, a series of cooling coils arranged vertically of the conveyor belt and curved reflectors extending in the casing to reflect heat waves from the conveyor against the cooling coils, said reflectors mounted on a pivoted cover member adapted to swing up to expose the reflectors for cleaning, and said conveyor belt composed of polyethylene.

References Cited in the file of this patent

UNITED STATES PATENTS

| | | |
|---|---|---|
| 972,511 | Crabb | Oct. 11, 1910 |
| 2,113,770 | Richardson | Apr. 12, 1938 |
| 2,212,916 | Hawkins et al. | Aug. 27, 1940 |
| 2,336,733 | Hull | Dec. 14, 1943 |
| 2,425,714 | Baer | Aug. 19, 1947 |